US011156714B2

(12) United States Patent
Abdulov

(10) Patent No.: US 11,156,714 B2
(45) Date of Patent: Oct. 26, 2021

(54) OBJECT MOVEMENT DETECTION BASED ON ULTRASONIC SENSOR DATA ANALYSIS

(71) Applicant: TYMPHANY ACOUSTIC TECHNOLOGY (HUIZHOU) CO., LTD., Guangdong Province (CN)

(72) Inventor: Alexey Abdulov, Taipei (TW)

(73) Assignee: TYMPHANY ACOUSTIC TECHNOLOGY (HUIZHOU) CO., LTD., Huizhou (CN)

( * ) Notice: Subject to any disclaimer, the term of this patent is extended or adjusted under 35 U.S.C. 154(b) by 71 days.

(21) Appl. No.: 16/790,348

(22) Filed: Feb. 13, 2020

(65) Prior Publication Data

US 2021/0255319 A1    Aug. 19, 2021

(51) Int. Cl.
  *G01S 15/62* (2006.01)
  *G01S 15/931* (2020.01)
  *G01S 7/534* (2006.01)

(52) U.S. Cl.
  CPC .............. *G01S 15/62* (2013.01); *G01S 7/534* (2013.01); *G01S 15/931* (2013.01)

(58) Field of Classification Search
  USPC .......................................................... 367/93
  See application file for complete search history.

(56) References Cited

U.S. PATENT DOCUMENTS

| 8,676,438 | B2 |   | 3/2014  | Yopp et al. |
| 9,297,891 | B2 | * | 3/2016  | Karl ...................... G01S 15/582 |
| 10,088,567 | B2 | * | 10/2018 | Lee .......................... G01S 7/527 |
| 10,234,549 | B2 | * | 3/2019  | Suchy ..................... G01S 7/521 |
| 10,345,445 | B2 | * | 7/2019  | Hustava ................ G01S 15/931 |
| 10,365,368 | B2 | * | 7/2019  | Tsuji ..................... B06B 1/0215 |
| 10,436,900 | B2 | * | 10/2019 | Fukuman .............. G01S 15/878 |
| 10,852,430 | B2 | * | 12/2020 | Aoyama ................. G01S 7/524 |
| 10,908,259 | B2 | * | 2/2021  | Suhre .................... G01S 15/931 |

\* cited by examiner

*Primary Examiner* — Omar Casillashernandez
(74) *Attorney, Agent, or Firm* — Muncy, Geissler, Olds & Lowe, P.C.

(57) ABSTRACT

Methods and devices for detecting movement of an object includes: receiving a first set of output signal values and a second set of output signal values from a sound wave receiver, each output signal value in the first set and the second set being representative of amplitude of an acoustic signal reflected from the object; determining, based on the received first set and second set, a difference set including one or more difference values, each of the one or more difference values being representative of a difference between a first output signal value in the first set and a second output signal value in the second set; determining whether the difference set satisfies a predetermined condition based on whether each difference value of the difference set has a magnitude exceeding a predetermined threshold; and outputting a motion detection signal if the difference set satisfies the predetermined condition.

20 Claims, 4 Drawing Sheets

OBJECT MOVEMENT DETECTION BASED ON ULTRASONIC SENSOR DATA ANALYSIS

TECHNICAL FIELD

The specification generally relates to ultrasonic sensors, and more particularly, to methods and devices for object movement detection based on ultrasonic sensor data analysis.

BACKGROUND

Proximity sensors are used to detect objects and object motion in proximity to the sensors. Ultrasonic sensors may detect objects and object movement by emitting ultrasonic sound waves from an ultrasonic wave source and detecting echoes of the ultrasonic waves that are reflected by surrounding objects. If the ultrasonic sensor receives echoes of the ultrasonic waves, it may determine that one or more objects are near the ultrasonic sensor. Based on the reception times and patterns of the echoes, the ultrasonic sensor may identify distinct objects in the vicinity of the sensor as well as movement characteristics of the objects.

SUMMARY

In one aspect, there is provided a computer-implemented method for detecting movement of an object. The method includes: receiving a first set of output signal values and a second set of output signal values from a sound wave receiver, each output signal value in the first set and the second set being representative of amplitude of an acoustic signal reflected from the object; determining, based on the received first set and second set, a difference set including one or more difference values, each of the one or more difference values being representative of a difference between a first output signal value in the first set and a second output signal value in the second set; determining whether the difference set satisfies a predetermined condition based on whether each difference value of the difference set has a magnitude exceeding a predetermined threshold; and outputting a motion detection signal if the difference set satisfies the predetermined condition.

In another aspect, there is provided a device for detecting movement of an object. The device includes a sound wave receiver, a processor, and a memory coupled to the processor. The sound wave receiver is configured to output a first set of output signal values and a second set of output signal values, each output signal value in the first set and the second set being representative of amplitude of an acoustic signal reflected from the object. The memory is configured to store instructions which if executed by the processor become operational with the processor to: receive the first set and the second set from the sound wave receiver; determine, based on the received first set and second set, a difference set including one or more difference values, each of the one or more difference values being representative of a difference between a first output signal value in the first set and a second output signal value in the second set; determine whether the difference set satisfies a predetermined condition based on whether each difference value of the difference set has a magnitude exceeding a predetermined threshold; and output a motion detection signal if the difference set satisfies the predetermined condition.

In yet another aspect, there is provided a non-transitory computer-readable storage medium. The non-transitory computer-readable storage medium includes instructions for detecting movement of an object, which instructions if executed by a processor become operational with the processor to: receive a first set of output signal values and a second set of output signal values from a sound wave receiver, each output signal value in the first set and the second set being representative of amplitude of an acoustic signal reflected from the object; determine, based on the received first set and second set, a difference set including one or more difference values, each of the one or more difference values being representative of a difference between a first output signal value in the first set and a second output signal value in the second set; determine whether the difference set satisfies a predetermined condition based on whether each difference value of the difference set has a magnitude exceeding a predetermined threshold; and output a motion detection signal if the difference set satisfies the predetermined condition.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
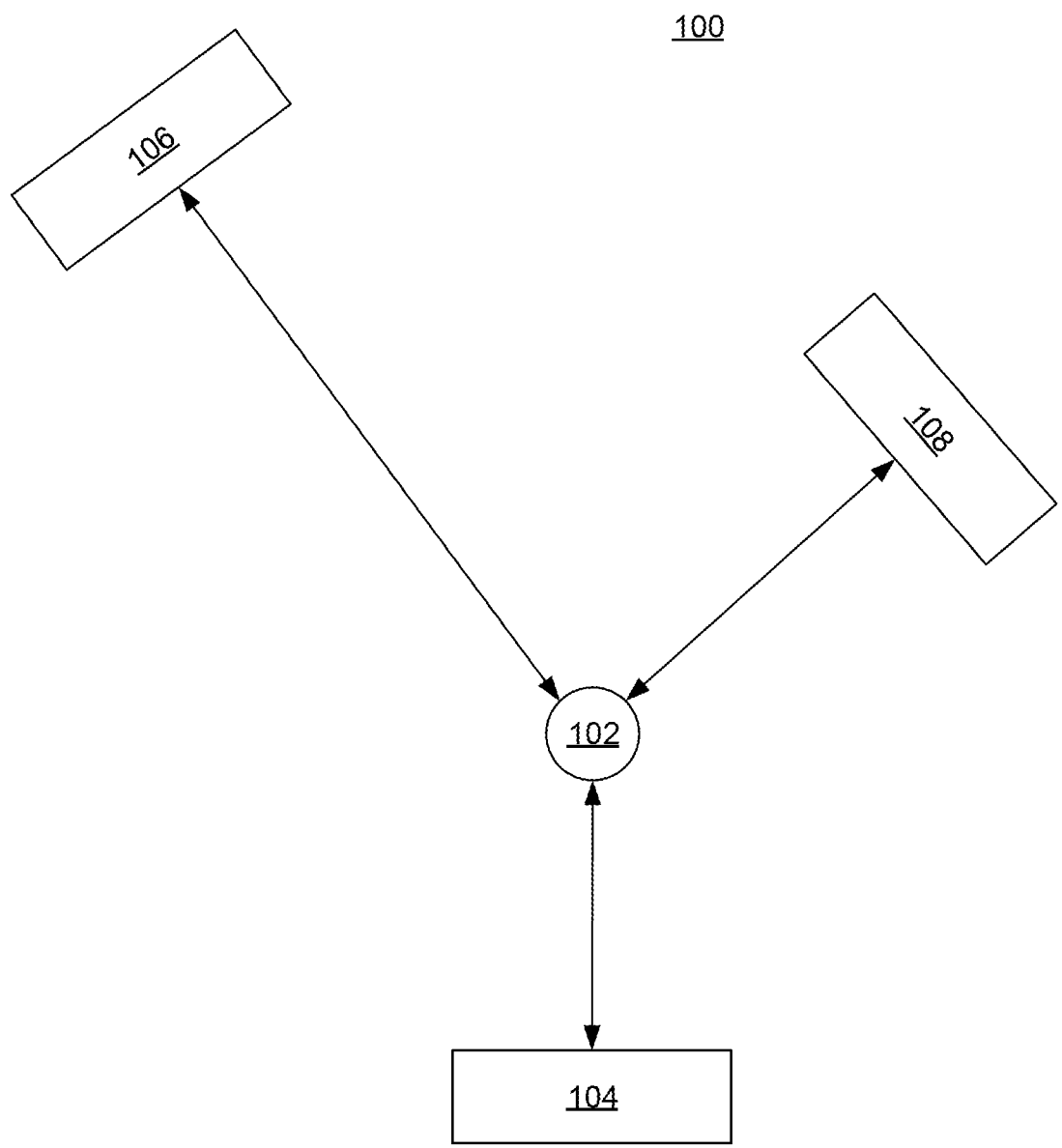
FIG. 1 is a diagrammatic representation of an exemplary scenario including acoustic signal emission and reception by a sound wave receiver.

Object movement detection may be used in a wide range of scenarios. For example, motion sensing systems may be used on vehicles to detect moving objects in blind zones near a vehicle, such as a backup sensing system. For another example, motion sensing systems may be used on a stereo system to detect moving human beings near speakers or microphones of the system. Based on the detected moving human beings, the stereo system may balance the volume load, cancel microphone echoes, activate the stereo system, increase or decrease volume of the stereo system, illuminate one or more controls (e.g., a button, a touchscreen, an LED indicator, or the like), activate one or more onboard lights, illuminate a user interface panel, or the like.

In an object movement detection device, one or more ultrasonic sources and sensors may be configured to emit and detect ultrasonic waves. The sources and sensors may be configured to face one or more directions to cover one or more corresponding angles of space, in which movement of objects may be detected. A typical approach ("distance-threshold approach") to detect movement of an object in the vicinity may determine a set of distances of the object over a time period, then determine whether the object is moving based on a change of the set of distances. For example, an ultrasonic sensor (e.g., Texas Instruments PGA460) used in the distance-threshold approach may generate distance data indicative of distances to a detected object in the vicinity over a time period. Changes of the distance data may be compared with a predetermined threshold value. If the changes exceed the threshold value, the object may be determined as moving in the time period. Otherwise, the object may be determined as still.

However, the distance-threshold approach may have challenges in detecting the movement of objects with non-ideal shapes or surfaces. For example, an object may have a semi-reflective surface (e.g., a fuzzy or fluffy surface) to sound waves, in which the reflection or echoes of the ultrasonic waves may be too weak to detect. In another example, portions of the surfaces of the object may not be perpendicular to an ultrasonic sensor, in which the reflections of the ultrasonic waves may deviate from the incoming direction of the ultrasonic waves, and the distance detection of the ultrasonic sensor may be erroneous. When such non-ideal objects are in the vicinity, the distance-threshold approach may result in false-rejections and false-detections. A false rejection occurs when actual movement is not detected, and a false detection occurs when non-movement is mistaken as movement.

The false detection may occur if the determined distances to a detected non-ideal object are unstable due to the unstable reflections of ultrasonic waves. For example, when the object has non-perpendicular surfaces, the determined distances to it may fluctuate in a wide range, which may result in a false determination that the object is moving. One way to cope with such false detection is to raise the threshold value for comparison. However, when the object is indeed moving and the changes of the determined distances fall below the threshold value, a false rejection may occur because such a movement may be invisible to the ultrasonic sensor. By adjusting the threshold value alone, it is difficult to suppress both false rejection and false detection. Accordingly, the distance-threshold approach may be unable to determine all types of movements accurately.

Various methods to reduce the high false-rejection rate and the high false-detection rate may be used for the distance-threshold approach. The configuration of the ultrasonic sources and sensors may limit the detection angle of each sensor, which may increase the costs and complexity of a device with wide-range movement detection capability.

In addition, in the distance-threshold approach of movement detection, an ultrasonic source may have no or few idle periods because it may need to continuously or intermittently emit ultrasonic soundwaves for the polling of the ultrasonic sensor. The ultrasonic sensor and source may always be active, which may increase the energy consumption of the device. Additionally, continuous or near-continuous transmission of ultrasonic waves may interfere with other ultrasonic transducers.

Also, some ultrasonic sensors have an upper limit on detected moving objects, such as a limit of 8 objects. Such a limit may cause omitted detection of moving objects, especially in an environment that has objects greatly exceeding the upper limit. The presently disclosed embodiments address one or more of these described challenges.

Embodiments of this specification provide methods and devices for object movement detection using an approach ("signal-amplitude approach") based on amplitude or strengths of ultrasonic waves received by an ultrasonic sensor. In this approach, a processor may receive amplitude data from an ultrasonic sensor, which is indicative of amplitude or strengths of sound waves (or "acoustic signals") received by the ultrasonic sensor. In some embodiments, the amplitude data may be digital or analog data and may not be preprocessed to indicate distances to objects. In other words, the output signals used by the presently disclosed systems and methods may include raw data, for example, in the form of output signal amplitude over time. The processor may receive a set of the amplitude data, which may represent signal amplitude over a certain time duration. By comparing sets of amplitude signals, the processor may determine whether detected objects are moving using a heuristic algorithm, independent of the types of surfaces of the objects to be detected or the normal directions of the surfaces. In some cases, the compared sets correspond to consecutive data sets captured during adjacent time periods between which no sensor output signals are sampled. In other cases, the compared sets may correspond to non-consecutive data sets captured during time periods between which other output signal sampling may be performed. The signal-amplitude approach may suppress the false-detection rate and the false-rejection rate and may not require the ultrasonic sensors and sources to be in an active status for long periods of time. By directly processing the amplitude data for movement detection, the ultrasonic sensor may use fewer resources for data preprocessing (e.g., converting raw data to be distance data), and thus increase its capability of detecting moving objects. Further, the disclosed techniques may enable greater accuracy in motion detections with fewer false detections and/or false rejections.

It should be noted that, although "ultrasonic" is used throughout this specification, embodiments of this specification are not limited to ultrasonic data, and the methods and devices disclosed herein may also be performed or implemented on object movement detection using non-ultrasonic waves, such as audible sound waves, infrasonic waves, or light waves (e.g., infrared light waves, RF waves, etc.). For ease of explanation without causing ambiguities, ultrasonic waves are used as examples for the description hereinafter, but it should be noted that any suitable signal waves may be used as a medium for object movement detection in place of the ultrasonic waves.

FIG. 1 is a diagrammatic representation of an exemplary scenario including acoustic signal emission and reception by a sound wave receivers. FIG. 1 includes sound wave receiver 102 and objects 104-108 in a surrounding environment of sound wave receiver 102. In some embodiments, sound wave receiver 102 may be an ultrasonic sensor or transducer. A sound source (e.g., an ultrasonic source) may emit sound waves (e.g., ultrasonic waves) into the environment, along a particular direction or range of directions or along a plurality of directions (e.g., where the transceiver is configured to emit ultrasonic waves from multiple different directions and receive reflections from corresponding directions). In some cases, ultrasonic transceivers may monitor eight or more different regions of an environment simultaneously, each region being associated with a dedicated sensor outputting signals corresponding to reflections received from a single region. The sound waves may be reflected by objects 104-108 back to sound wave receiver 102. In some embodiments, the sound source may be integrated with sound wave receiver 102 as a single device. In those cases, the arrows in FIG. 1 indicates the directions of the sound waves emitted and reflected. Sound wave receiver 102 may generate data (e.g., analog data or digital data) indicative of amplitude of the received sound waves. In some embodiments, the data may be transmitted to a processor (not shown in FIG. 1) for further analysis. In some embodiments, the processor may be integrated with sound wave receiver 102 as a single device. In some embodiments, the processor may be separate from sound wave receiver 102.

Figure 2:
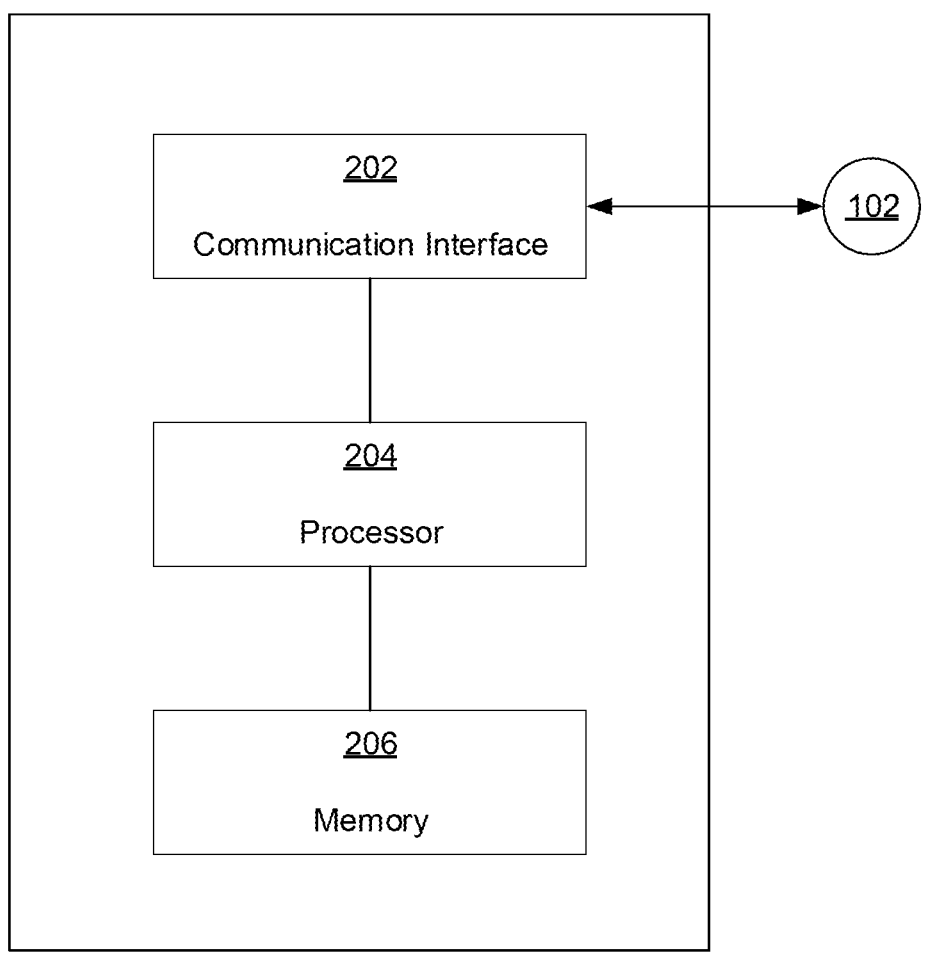
FIG. 2 is a block diagram representation of an example device for object movement detection, according to presently disclosed embodiments.

FIG. 2 is a block diagram representation of an example device 200 for object movement detection, according to presently disclosed embodiments. Referring to FIG. 2, device 200 may include a communication interface 202, a processor 204, and a memory 206. Communication interface 202, processor 204, and memory 206 are coupled or connected in device 200 and may be implemented as integrated circuits or chips. In some embodiments, device 200 may additionally include sound wave receiver 102 as a single device. In some embodiments, device 200 is independent of sound wave receiver 102.

Communication interface 202 may be interfaced with sound wave receiver 102 to receive data generated by sound wave receiver 102 or transmit control data to sound wave receiver 102. In some embodiments, when device 200 is independent of sound wave receiver 102, communication interface 202 may be coupled or connected to sound wave receiver 102 according to a communication standard or protocol. The communication standard may be, for example, a wired communication standard, a Bluetooth® standard, a near-field communication (NFC) standard, an infrared communication protocol, or any suitable wired or wireless communication standard. In some embodiments, when device 200 includes sound wave receiver 102, communication interface 202 may be coupled or connected to sound wave receiver 102 by an internal bus.

Processor 204 may include any suitable electronic device capable of manipulating or processing information. Processor 204 may include an integrated circuit or a chip for processing data, such as data communicated from communication interface 202. For example, processor 204 may include any combination of any number of a programmable logic controller, a microcontroller, a microprocessor, a digital or analog signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), a central processing unit (or "CPU"), a graphics processing unit (or "GPU"), an optical processor, or any type of circuits capable of data processing. Processor 204 may be coupled with memory 206 and execute instructions stored in memory 206.

Memory 206 may be a generic or specific electronic device capable of storing codes and data accessible by processor 204. Memory 206 may include any type of volatile or non-volatile memory devices, or a combination thereof. For example, memory 206 may include any combination of any number of a random-access memory (RAM), a static random-access memory (SRAM), a read-only memory (ROM), an electrically erasable programmable read-only memory (EEPROM), an erasable programmable read-only memory (EPROM), a programmable read-only memory (PROM), an optical or magnetic disc, a hard drive, a solid-state drive, a flash drive, a security digital (SD) card, a memory stick, a compact flash (CF) card, or any type of storage device. Providing processor 204 with access to instructions stored in memory 206 for performing the techniques disclosed herein configures the processor (or programs the processor) as a specialized machine for performing the disclosed motion detection functions. When the instructions in memory 206 are executed by processor 204, device 200 may perform an operation on the data received from sound wave receiver 102.

Figure 3:
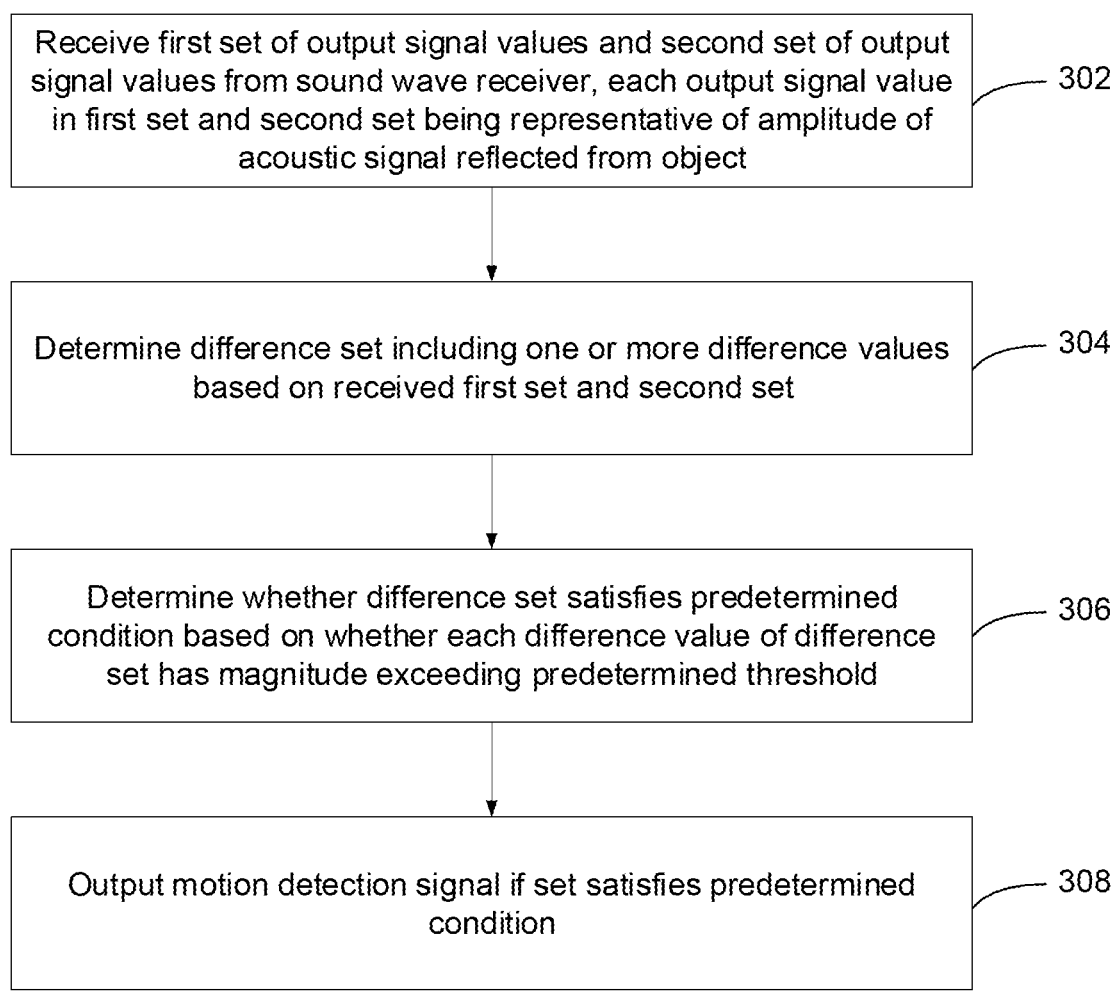
FIG. 3 is a flowchart of an example method for object movement detection, according to presently disclosed embodiments.

FIG. 3 is a flowchart of an example method 300 for object movement detection, according to presently disclosed embodiments. For example, method 300 may be performed by device 200. In some embodiments, method 300 may be implemented as software or firmware, such as program codes or instructions, stored in a computer-readable storage medium (e.g., memory 206). The program codes or instructions may be read and executed by a processor (e.g., processor 204) to implement method 300.

Referring to FIG. 3, at step 302, a processor (e.g., processor 204) receives a first set of output signal values and a second set of output signal values from a sound wave receiver (e.g., sound wave receiver 102). Each output signal value in the first set and the second set may be representative of the amplitude of a received acoustic signal (e.g., sound waves reflected from the sensor environment, including from one or more objects in the environment). The sets of output signal values each may correspond to output signals collected from the sensor over certain time intervals (e.g., during a "listen" mode of the sensor following a burst mode of the ultrasonic emitter). In some cases, each set of output signal values may correspond to a "listen" period of the sensor following an emission of ultrasonic waves. In some embodiments, the sound wave receiver may include an ultrasonic sensor or an ultrasonic transducer. The sound wave receiver may generate the output signal values representing the amplitude of received acoustic signal(s) (e.g., received reflected ultrasonic waves) over time intervals. For example, the sound wave receiver may sample the acoustic signal over time and generate output signal values representing variations in amplitude of the received acoustic signal over time. In some embodiments, the processor may receive the output signal values via a communication interface (e.g., communication interface 202).

The output signal values may represent strengths or amplitudes of the received acoustic signals resulting from sound wave emissions from a source (e.g., which may be integrated with or independent from the sound wave receiver) and reflected by an object or objects in the sensor environment. The output signal values may be proportional to corresponding amplitudes of the received acoustic signals. Generally, the amplitude of the received acoustic signal and/or output signal may be related to the presence of one or more objects in the sensor environment (e.g., reflected signals received at certain times/distances may indicate the presence of detected objects at those distances and may have higher signal strengths than times/distances where no objects are detected); may be related to the type of object detected (e.g., the reflectivity of the object, shape of the object, orientation of the object, etc.); and/or the distance of the detected object relative to the sensor. For example, more distant objects may be associated with lower reflected signal amplitudes as compared to objects closer to the sensor. In some cases, a sensor may generate output signal values in response to received acoustic reflections that vary from the millivolt range for near objects to microvolts for more distant objects. A time-varying gain may be applied to the sensor such that the generated output signals are amplified (e.g., progressively or stepwise) over a range of time of flight/distance values. Assuming a speed of sound of approximately 343 m/s, objects located at about 2 m from the sensor may be associated with a time-of-flight of about 12 milliseconds. Objects at 7 m away from the sensor will be associated with a time of flight of about 40 milliseconds. By applying a time-varying gain, sensor output signals generated in response to acoustic reflections from objects at 2 m and at 7 m may be similar.

In some embodiments, the sound wave receiver may output sets of digital output signal values. For example, each burst of emitted ultrasonic waves may result in a corresponding set of output signals representative of received reflections from one or more objects in an environment of the sensor. The sets of output signals may, for example, represent a stream of output signal strengths from the sensor over time. Variations in signal strength may indicate the presence of received reflections (received at different times, corresponding to different distance values) as a result of an emitted burst of ultrasonic waves. Each reflected signal may correspond to one or more objects present in the sensor environment. And, the times at which the reflected signals are received may indicate a distance of the detected object from the sensor (e.g., the distances may be determined based on time of flight calculations). The sets of output signals (e.g., a first set and a second set) may include digital values (e.g., a binary, octal, decimal, or hexadecimal value), and each value may relate to a signal strength of a received reflection signal (e.g., with or without an applied gain). Each set may have a predetermined size. For example, each set may be outputted as an array with a certain length. The sound wave receiver may be designed or configured to provide certain sized output data sets based on the requirements of a particular application (e.g., a balance between transmission bandwidth and data resolution).

In some cases, the sets may be outputted as arrays, each array having a length of X bytes where X is an integer (e.g., 32, 64, 128, 256, or any integer). In some embodiments, the received output signal sets may be stored in memory 206, each set having a length of X bytes. The sensor resolution may correspond to an allocation of the available bytes in the array to individual output signal values and the number of bits occupied by each output sensor value. Representing sensor output values in an 8-bit format may result in 1024 output signal values for a 128-byte array. These output signal values, as noted, correspond to signal strength values of the received reflections over the time duration selected as the "listen" period following a burst of emitted ultrasonic sound waves, for example. The output signal values, along with their associated amplitudes and times of flight may be used to determine the presence of objects in the sensor environment and to calculate the corresponding distances of those objects from the sensor. In some embodiments, the received output signal values may be determined, for example, as shown in FIG. 4.

Figure 4:
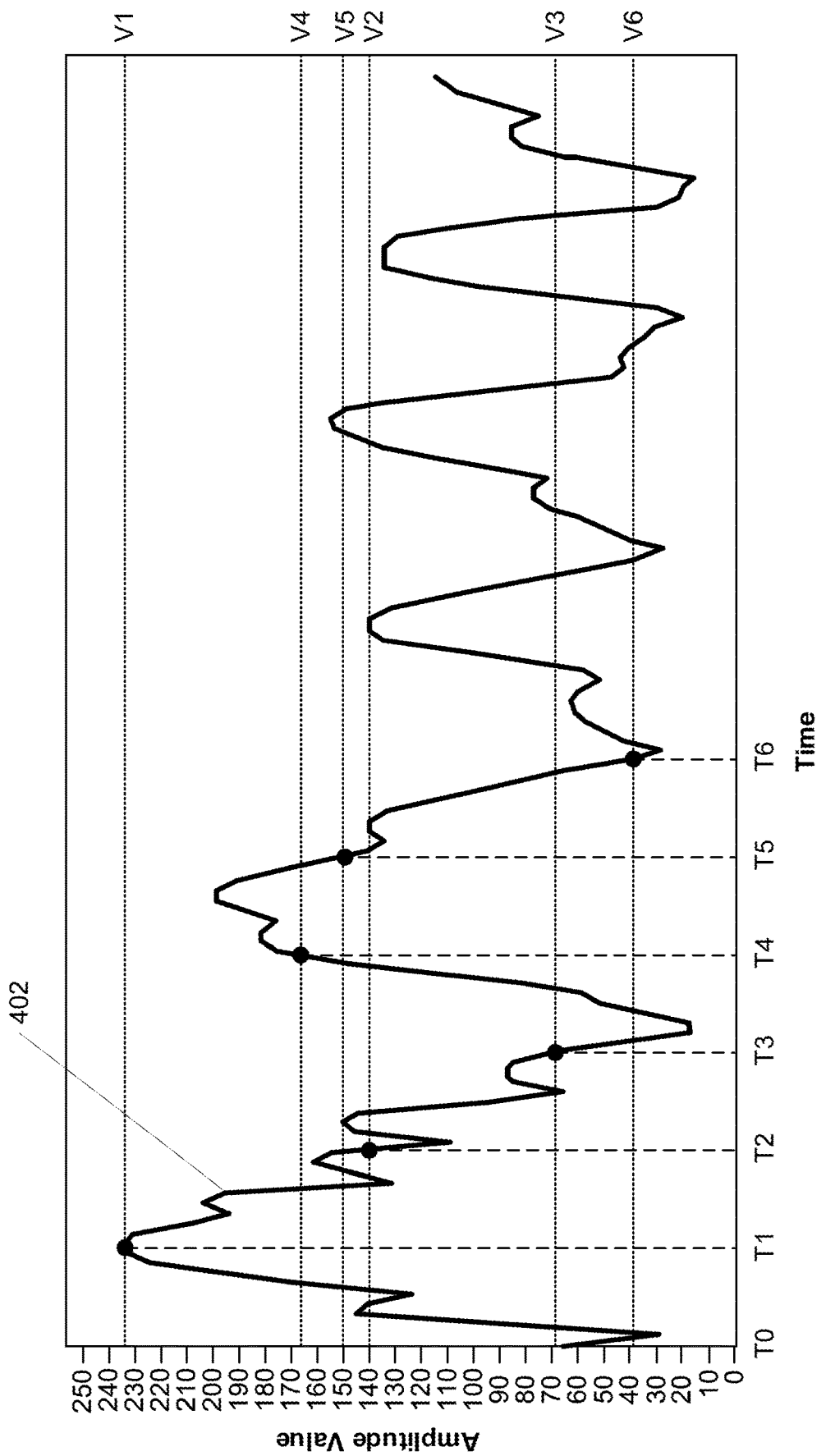
FIG. 4 is a graphical representation of time-dependent amplitude values of an example sound wave received by a sound wave receiver, according to presently disclosed embodiments.

FIG. 4 is a graphical representation of time-dependent amplitude values of output signals generated by a sensor in response to received reflected signals. Referring to FIG. 4, the vertical axis represents the amplitude of output signal values ("amplitude values") that may be provided to the processor. The horizontal axis represents the time when the sound wave receiver received the corresponding reflected signals, including timestamps T0-T6. The values of the vertical axis in FIG. 4 are related to strengths of the acoustic wave received by the sound wave receiver. For example, in some cases, the output signals generated by the sensor may correspond directly to the strength of received reflected signals (with no applied gain or with a uniformly applied gain). In other cases, however, a time-varying gain may be applied relative to the received reflected signal strengths to yield the output signals from the sensor, as represented by FIG. 4.

FIG. 4 shows a graphical representation of the output signal values generated by the acoustic sound sensor, for example, in response to received ultrasonic signal reflections from objects in the sensor environment. Rather than the graphical representation shown in FIG. 4, the sensor output may also be provided as an array of data points, each data point representing the amplitude of the output signal at a corresponding time. The number of data points included in the array, as noted above, may depend on the specifications of a particular sensor, the resolution of the sensor, the bit length of each data point, etc. In FIG. 4, amplitude curve 402 may be generated by plotting the time-dependent amplitudes of the sensor output signals received by the processor. In some cases, the plot of FIG. 4 may be generated as scatter points connected with line segments. In other cases, one or more point-fitting techniques or smoothing functions may be applied to the array of data points to provide the graphical representation shown in FIG. 4. Each listen mode may result in an array of data points representing the signal strength of received reflections during the time period associated with the listen mode. As will be discussed in more detail below, movements of objects in the environment of the sensor may be detected by comparing arrays of output signal values corresponding to different listen mode time intervals. In some cases, the compared arrays may correspond to sequential listen mode time intervals, and in other cases, the compared arrays may correspond to non-sequential listen mode time intervals.

For illustrative purposes, six output signal values V1-V6 are shown along curve 402 at corresponding to timestamps T1-T6. Many more points, however, may be included in each array of output signal values provided by the sensor. In the disclosed embodiments, differences between corresponding points in two or more arrays of output values may be used to detect object movement. For example, in some cases, an output signal value V1 at time T1 on curve 402 may be compared to a corresponding point in one or more other arrays of output values to detect object movement. In FIG. 4, output signal values V1-V6 have magnitudes of 235, 140, 68, 166, 150, and 38, respectively. Output signal values V1-V6 may be represented as decimal values, or their values may be represented in any appropriate notation system (e.g., binary, octal, or hexadecimal values).

In some embodiments, each array of output signal values (e.g., a first set of values, a second set of values, etc.) provided by the sensor may include the same number of output signal values. And, as noted, similarly indexed output signal values in different arrays may be compared to detect object movement. In some embodiments, the sound wave receiver may output a first set of output values in a first array and may output a second set of output values in a second array. Corresponding values from the first and second array may be compared to detected object movement. In some embodiments, the sound wave receiver may output the first set earlier than the second set, where the first and second sets of output values correspond to sequential listen modes. In other cases, the first and second sets compared to detect object motion may correspond to non-sequential listen modes.

In the disclosed embodiments, comparing raw output signal values (e.g., values representative of received reflected signal strength rather than secondary values, such as calculated distances, etc.) can improve detection of object movement. In practice, each array of output signal values may represent the output signal values of the sensor during a different listen-mode time interval. Peaks in the output signal values in each array may represent objects in the environment of the sensor, as each peak is generated by a received reflection signal from the environment. Distances to the detected objects producing the reflected signals (in response to incident emitted sound waves, for example) can be determined based on the time at which the received reflection signal is received (e.g., 343 m/s multiplied by the reflection signal time divided by 2 if the emitted signal originates from the same location as the acoustic sensor). Comparing changes in the peaks of the output signal values included in different arrays can indicate how object positioning, orientation, etc. has changed from one listen mode time interval to another. Such changes can indicate whether an object is moving toward or away from the sensor (e.g., if a peak as shown in FIG. 4 shifts to the left or right in a subsequent array) or whether an object is moving side to side or in an arc relative to the sensor (e.g., if two peaks in compared arrays have similar positions in time, but different peak shapes, the differences in peak shape, amplitude, etc. may indicate one or more changes in orientation that may be associated with side to side or arc-wise movement).

In a particular example, the sound wave receiver may output an array of output signal values corresponding to the graphically-represented curve 402, as shown in FIG. 4. A first set of values corresponding to the array outputted to provide curve 402 may include {V1, V2, V3, V4, V5, V6}, among potentially many other points. A second set of values corresponding to the sensor output array from a different listen mode time interval may include {V1', V2', V3', V4', V5', V6'}, among potentially many other points. The first output signal value referenced in step 302 may be one of {V1, V2, V3, V4, V5, V6} (or any other point from a first array), and the second output signal value referenced in step 302 may be one of {V1', V2', V3', V4', V5', V6'}, or any other corresponding point from the second array. For example, the first and second output signal values to be compared may be V4 and V4', respectively. In one example, the first and second sets may be outputted to the processor sequentially, with the first set earlier than the second set. In some cases, the first and second sets of output values may correspond to sequential listen mode time periods such that no signal output values are provided by the sensor between the first set and the second set of output signal values to be compared.

It should be noted that although timestamps T0-T6 in FIG. 4 are shown as having equal intervals, in some embodiments, the interval between them may be non-equal. In some embodiments, the first and second sets may include a different number of output signal values. For example, the second set may include more output signal values than the first set, or vice versa. In some embodiments, when the sound wave receiver output the first and second sets as arrays, the first and second output values compared among the arrays may have the same indices in the corresponding arrays or, in some cases, may have different indices.

Referring back to FIG. 3, at step 304, the processor can compare arrays of output signal values by, for example, determining a difference set array representative of one or more difference values between corresponding output signal values (or even non-corresponding points, in some cases) in two different output signal arrays. In other words, each of the difference values in a difference set may be representative of a difference between a first output signal value in the first set (array) and a second output signal value in the second set (array). For example, as shown in FIG. 4 and described in step 302, the processor may receive the first set of output values in the form of an array including output signal values {V1, V2, V3, V4, V5, V6} and the second set of output signal values to be compared in the form of an array including {V1', V2', V3', V4', V5', V6'}. The difference array may, for example, include differences between corresponding data points (e.g., sensor output signal values) in the arrays. In one embodiment, the difference array may include the differences between output signal values and may be represented as { . . . V1-V1', V2-V2', V3-V3', V4-V4', V5-V5', V6-V6' . . . }. The processor may store the difference values, for example, as a set of values in a difference array (e.g., { . . . V1-V1', V2-V2', V3-V3', V4-V4', V5-V5', V6-V6' . . . }). Such a difference value array is exemplary only, as difference value arrays may include many more values, fewer values, or may contain one or more values between the example values V1-V1', V2-V2', V3-V3', V4-V4', V5-V5', V6-V6'.

The processor may analyze values included in one or more difference value arrays to detect object motion. For example, referring to FIG. 3, at step 306, the processor may determine whether difference values included in one or more difference value arrays satisfy a predetermined condition. In some cases, the processor may determine whether each difference value of the difference set has a magnitude exceeding a predetermined threshold. Difference values that exceed a predetermined threshold may indicate a change between corresponding data points from one output value array to another and, therefore, may indicate object motion. While in some cases, it may be sufficient to base a detection of object motion on a single difference value of the difference array and whether the difference value exceeds a threshold, other predetermined conditions may also be employed. In some embodiments, the predetermined condition for concluding that object motion has occurred may be that at least a predetermined number of the difference values in the difference set have magnitudes (e.g., absolute values) exceeding the predetermined threshold. In some embodiments, the predetermined condition may be that a predetermined percentage of the difference set values must exceed a certain threshold in order to conclude that motion has occurred. The percentage may be selected based on the requirements of a particular application. In some cases, the percentage may be 10%, 25%, 50%, etc.

The threshold for evaluating difference set values may also be selected based on the requirements of a particular application. Lower threshold levels may result in higher sensitivity to object motion. Higher threshold levels may result in fewer false positives. It may also be possible to select more than one threshold value (e.g., a time-varying threshold that increases or decreases relative to increasing time associated with the difference value set, step-wise increasing or decreasing thresholds relative to time, etc.). In some embodiments, the predetermined threshold value may be based on the expected sizes of objects to be detected, reflectivity of objects to be detected, expected moving speeds of objects, etc. For example, small objects may have a wider range of amplitude changes, and the threshold value may be set accordingly higher than for large objects. Additionally, fast-moving objects may result in a wider range of amplitude changes, and the threshold value may be set accordingly higher than that of slow-moving objects. It should be noted that the examples only cover limited instances of actual scenarios, and the threshold value may be predetermined according to different protocols beyond the examples shown herein.

Referring to FIG. 3, at step 308, if the difference set satisfies the predetermined condition, the processor may output a motion detection signal (e.g., data representing that the object is moving relative to the sound wave receiver). If the difference set does not satisfy the predetermined condition, the processor may not output the motion detection signal.

In some embodiments, method 300 may be performed in an iterative manner. For example, after performing step 308 in a first iteration, the processor may repeat the process of method 300 by performing step 302 in a second iteration. In some embodiments, when performing step 302 in the second iteration, the processor may receive a third set and a fourth set of output signal values (e.g., third and fourth arrays of sensor output values), which are different from the first and second set of values, and perform steps 304-308 based on the third and fourth sets. For example, difference arrays may be generated based on difference comparisons between any two sets of output signal values. In some cases, the difference arrays may include difference values between a first set and a second set of sensor output values, a second set and a third set of output values, a third set and a fourth set of sensor output values, etc. In some examples, the difference sets may be generated based on non-sequential arrays of output signal values (e.g., first to third sets, second to fourth, third to fifth, etc.). It may be possible to generate difference value arrays based on any combination of sensor value arrays. Motion detection signals, indicative of the presence of movement in the sensor environment, may be based on evaluation (as described above) of difference values in any difference value array generated based on any combination of sensor value output arrays. Motion detection signals may also be generated based on an analysis of more than one difference value array. For example, values in multiple difference value arrays (2, 3, 4, etc.) may be analyzed by the processor to determine how values in those arrays compare to predetermined thresholds, how many of the values exceed thresholds, what percentage of the difference values in multiple difference value arrays exceed predetermined thresholds, etc. in determining whether motion has been detected.

In response to a motion detection signal, a device may take any appropriate action. In some cases, such as a loudspeaker, an issued motion detection signal indicating detected motion may cause one or more lights to change state, an audible indicator to sound, a power-on indicator to be displayed, a user interface screen to illuminate, etc. Similar responses, or any other appropriate responses, may be performed by mobile devices, computing devices, or any other type of device with access to a motion detection signal issued by a processor as described above.

The embodiments herein may be implemented using software programming or software elements the disclosure may be implemented with any programming or scripting languages such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the disclosure could employ any number of conventional techniques for electronics configuration, signal processing, and/or control, data processing, and the like. The steps of all methods described herein may be performable in any suitable order unless otherwise indicated herein or otherwise clearly contradicted by context.

In this disclosure, the terms "signal," "data," and "information" are used interchangeably. The use of "including" or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The term "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion.

In addition, the articles "a" and "an" as used in this disclosure and the appended claims should generally be construed to mean "one or more" unless specified otherwise or clear from context to be directed to a singular form. Moreover, use of the term "an aspect" or "one aspect" throughout is not intended to mean the same embodiment or aspect unless described as such. Furthermore, recitation of ranges of values herein are merely intended to serve as a shorthand method of referring individually to each separate value falling within the range, unless otherwise indicated herein, and each separate value is incorporated into the specification as if it were individually recited herein.

As used in this disclosure, the term "or" is intended to mean an inclusive "or" rather than an exclusive "or" for two or more elements it conjoins. Unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" used in this disclosure is intended to mean an "and" or an inclusive "or." That is, unless specified otherwise, or clear from context, "X includes A, B, and/or C" is intended to mean X may include any combinations of A, B, and C. In other words, if X includes A; X includes B; X includes C; X includes both A and B; X includes both B and C; X includes both A and C; or X includes all A, B, and C, then "X includes A, B, and/or C" is satisfied under any of the foregoing instances. Similarly, "X includes at least one of A, B, and C" is intended to be used as an equivalent of "X includes A, B, and/or C."

The aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines or connectors shown in the various figures presented are intended to represent example functional relationships and/or physical or logical couplings between the various elements. Many alternative or additional functional relationships, physical connections, or logical connections may be present in a practical device.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A computer-implemented method for detecting movement of an object, the method comprising:
 receiving a first set of output signal values and a second set of output signal values from a sound wave receiver, each output signal value in the first set and the second set being representative of amplitude of an acoustic signal reflected from the object;

determining, based on the received first set and second set, a difference set including one or more difference values, each of the one or more difference values being representative of a difference between a first output signal value in the first set and a second output signal value in the second set;

determining whether the difference set satisfies a predetermined condition based on whether each difference value of the difference set has a magnitude exceeding a predetermined threshold; and outputting a motion detection signal if the difference set satisfies the predetermined condition.

2. The computer-implemented method of claim 1, wherein the first set and the second set comprise the same number of output signal values.

3. The computer-implemented method of claim 2, wherein the first set and the second set are output as arrays by the sound wave receiver, and the first output signal value and the second output signal value have the same index in the arrays.

4. The computer-implemented method of claim 1, wherein the sound wave receiver comprises an ultrasonic sensor.

5. The computer-implemented method of claim 1, wherein the sound wave receiver comprises an ultrasonic transducer.

6. The computer-implemented method of claim 1, wherein the first set is output by the sound wave receiver earlier than the second set, and wherein the sound wave receiver outputs no signal value between the first set and the second set.

7. The computer-implemented method of claim 1, further comprising:
determining the predetermined threshold value based on at least one of a set of sizes of objects to be detected or a set of moving speeds of the objects to be detected.

8. The computer-implemented method of claim 1, wherein the predetermined condition comprises that at least a predetermined number of the difference values in the difference set have magnitudes exceeding the predetermined threshold.

9. The computer-implemented method of claim 8, further comprising:
determining the predetermined number based on at least one of a set of sizes of objects to be detected or a set of moving speeds of the objects to be detected.

10. The computer-implemented method of claim 1, wherein the predetermined condition comprises that a portion of the difference set exceeds a predetermined percentage, wherein the portion comprises difference values having magnitudes exceeding the predetermined threshold.

11. The computer-implemented method of claim 10, further comprising:
determining the predetermined percentage based on at least one of a set of sizes of objects to be detected or a set of moving speeds of the objects to be detected.

12. A device for detecting movement of an object, the device comprising:
a sound wave receiver configured to output a first set of output signal values and a second set of output signal values, each output signal value in the first set and the second set being representative of amplitude of an acoustic signal reflected from the object;
a processor; and
a memory coupled to the processor, the memory configured to store instructions which if executed by the processor become operational with the processor to:
receive the first set and the second set from the sound wave receiver;
determine, based on the received first set and second set, a difference set including one or more difference values, each of the one or more difference values being representative of a difference between a first output signal value in the first set and a second output signal value in the second set;
determine whether the difference set satisfies a predetermined condition based on whether each difference value of the difference set has a magnitude exceeding a predetermined threshold; and
output a motion detection signal if the difference set satisfies the predetermined condition.

13. The device of claim 12, wherein the first set and the second set comprise the same number of output signal values.

14. The device of claim 13, wherein the first set and the second set are output as arrays by the sound wave receiver, and the first output signal value and the second output signal value have the same index in the arrays.

15. The device of claim 12, wherein the sound wave receiver comprises an ultrasonic sensor.

16. The device of claim 12, wherein the sound wave receiver comprises an ultrasonic transducer.

17. The device of claim 12, wherein the first set is output by the sound wave receiver earlier than the second set, and wherein the sound wave receiver outputs no signal value between the first set and the second set.

18. The device of claim 12, wherein the memory further comprises instructions which if executed by the processor become operational with the processor to:
determine the predetermined threshold value based on at least one of a set of sizes of objects to be detected or a set of moving speeds of the object to be detected.

19. The device of claim 9, wherein the predetermined condition comprises one of:
at least a predetermined number of the difference values in the difference set have magnitudes exceeding the predetermined threshold; or
a portion of the difference set exceeds a predetermined percentage, wherein the portion comprises difference values having magnitudes exceeding the predetermined threshold.

20. A non-transitory computer-readable storage medium, comprising instructions for detecting movement of an object, which instructions if executed by a processor become operational with the processor to:
receive a first set of output signal values and a second set of output signal values from a sound wave receiver, each output signal value in the first set and the second set being representative of amplitude of an acoustic signal reflected from the object;
determine, based on the received first set and second set, a difference set including one or more difference values, each of the one or more difference values being representative of a difference between a first output signal value in the first set and a second output signal value in the second set;
determine whether the difference set satisfies a predetermined condition based on whether each difference value of the difference set has a magnitude exceeding a predetermined threshold; and output a motion detection signal if the difference set satisfies the predetermined condition.

* * * * *